(12) United States Patent
Lachenberg

(10) Patent No.: US 9,587,414 B2
(45) Date of Patent: Mar. 7, 2017

(54) FULLY WELDED FENCE PANEL AND METHOD OF MAKING SAME

(71) Applicant: James A Lachenberg, Cumming, GA (US)

(72) Inventor: James A Lachenberg, Cumming, GA (US)

( * ) Notice: Subject to any disclaimer, the term of this patent is extended or adjusted under 35 U.S.C. 154(b) by 304 days.

(21) Appl. No.: 13/784,956

(22) Filed: Mar. 5, 2013

(65) Prior Publication Data

US 2014/0252290 A1   Sep. 11, 2014

Related U.S. Application Data

(60) Provisional application No. 61/705,219, filed on Sep. 25, 2012.

(51) Int. Cl.
| | |
|---|---|
| *E04H 17/16* | (2006.01) |
| *E04H 17/14* | (2006.01) |
| *B23K 1/00* | (2006.01) |
| *B23K 9/04* | (2006.01) |
| *B23K 9/09* | (2006.01) |
| *B23K 9/10* | (2006.01) |
| *B23K 9/167* | (2006.01) |

(52) U.S. Cl.
CPC ........... *E04H 17/1417* (2013.01); *B23K 1/00* (2013.01); *B23K 9/04* (2013.01); *B23K 9/092* (2013.01); *B23K 9/1043* (2013.01); *B23K 9/167* (2013.01); *E04H 2017/1491* (2013.01); *Y10T 403/477* (2015.01)

(58) Field of Classification Search
CPC .............. E04H 17/143; E04H 17/1417; E04H 17/1421; E04H 17/1434; E04H 2017/1491; E04H 17/1439; E04F 11/1817; E04F 11/1834; F16B 17/004; Y10T 403/477; Y10T 403/4634
USPC ............................................. 256/22, 65.1, 1
See application file for complete search history.

(56) References Cited

U.S. PATENT DOCUMENTS

|  |  |  |  |  |
|---|---|---|---|---|
| 378,051 | A | * | 2/1888 | Griswold ........................ 256/32 |
| 643,591 | A | * | 2/1900 | Caswell ........................ 403/242 |
| 1,609,795 | A | * | 12/1926 | Carlson et al. .................. 256/57 |
| 1,684,802 | A | * | 9/1928 | Ochiltree ........................ 256/21 |
| 1,773,357 | A | * | 8/1930 | Griswold ...................... 244/131 |
| 1,914,344 | A | * | 6/1933 | Ragsdale ...................... 403/170 |
| 2,299,143 | A | * | 10/1942 | Hellwig ........................ 403/270 |
| 2,835,513 | A | * | 5/1958 | Pearson ........................ 285/222 |
| 2,846,241 | A | * | 8/1958 | McDonnell et al. ......... 285/192 |

(Continued)

*Primary Examiner* — Matthieu F Setliff
*Assistant Examiner* — Matthew R McMahon
(74) *Attorney, Agent, or Firm* — Michael A. Morra, Esq.

(57) ABSTRACT

A fully welded fence panel comprises a plurality of vertical pickets and a pair of horizontal metal rails. The top and bottom portions of the pickets are pressed in a mechanical or hydraulic press to create flattened surfaces and welded to the rails. The flattened surfaces may either be oriented parallel or perpendicular to the lengthwise direction of the metal rails to facilitate welding or to enable the fence panel to be racked when used as a railing. Indentations are pressed into opposite sides of the flattened surfaces at the same location and are perpendicular to the lengthwise direction of the picket to further enable the fence panel to be racked. The railing is therefore adjustable at a customer's site to change the angle between the pickets and rails and avoid the need for perfect angle measurements prior to manufacture.

7 Claims, 5 Drawing Sheets

(56) References Cited

U.S. PATENT DOCUMENTS

| | | | |
|---|---|---|---|
| 2,909,361 A * | 10/1959 | Dotson | 256/21 |
| 3,039,799 A * | 6/1962 | Gerace | 228/182 |
| 3,244,406 A * | 4/1966 | Garofola | 256/21 |
| 3,339,895 A * | 9/1967 | Kusel et al. | 256/22 |
| 3,343,811 A * | 9/1967 | Kusel et al. | 256/22 |
| 3,456,921 A * | 7/1969 | Hinkle | 256/22 |
| 3,704,005 A * | 11/1972 | Kusel | 256/22 |
| 3,736,720 A * | 6/1973 | Larson | 52/741.1 |
| 3,848,855 A * | 11/1974 | Weiland | 256/73 |
| 3,960,367 A | 6/1976 | Rogers | |
| 4,138,094 A | 2/1979 | Thir | |
| 4,351,469 A * | 9/1982 | Newman | 228/135 |
| 4,723,760 A | 2/1988 | O'Sullivan | |
| 5,192,054 A * | 3/1993 | Sharp | 256/24 |
| 5,581,868 A * | 12/1996 | Bisch | 29/525.08 |
| 6,631,887 B1 | 10/2003 | Walmsley | |
| 7,086,642 B1 * | 8/2006 | O'Brien | 256/73 |
| 7,621,510 B2 * | 11/2009 | Gibbs et al. | 256/22 |
| 7,980,534 B1 | 7/2011 | Gibbs et al. | |
| 8,205,834 B2 * | 6/2012 | Maenz | 244/123.4 |
| 8,899,555 B2 * | 12/2014 | Sherstad | 256/65.01 |
| 2009/0152521 A1 * | 6/2009 | Serrano Vicario | 256/21 |
| 2010/0200827 A1 | 8/2010 | Duffy et al. | |
| 2010/0264388 A1 | 10/2010 | Duffy et al. | |
| 2011/0155982 A1 | 6/2011 | Duffy et al. | |

\* cited by examiner

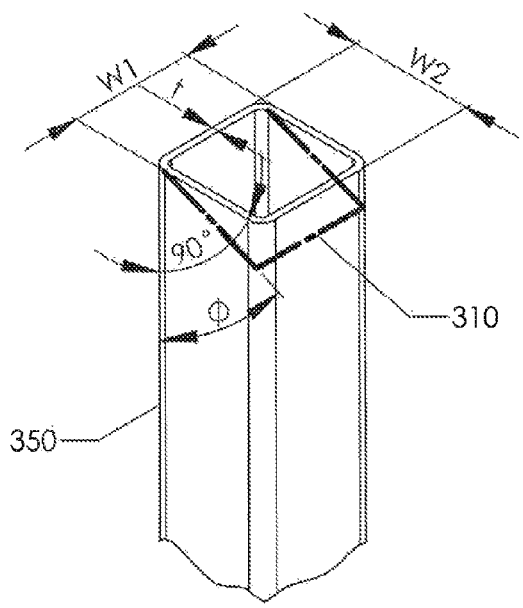
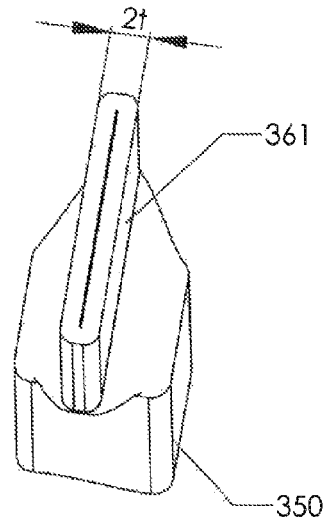
FIG 3A
FIG 3B
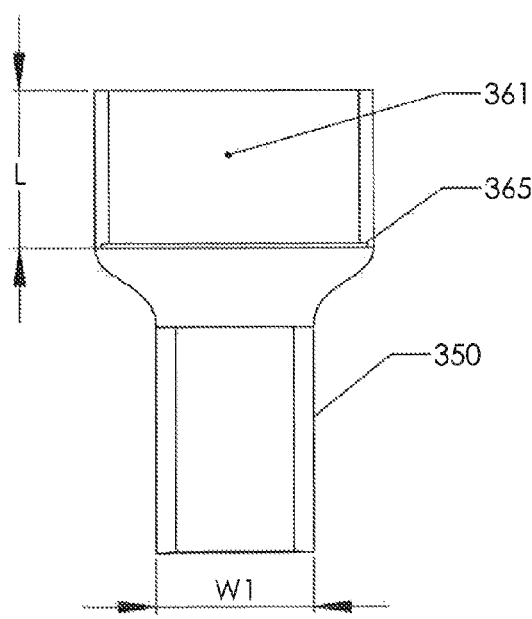
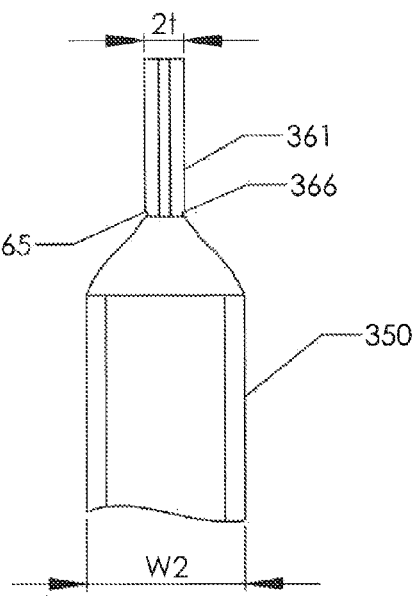
FIG 3C
FIG 3D

FULLY WELDED FENCE PANEL AND METHOD OF MAKING SAME

CROSS REFERENCE TO RELATED APPLICATIONS

This application claims the benefit of U.S. Provisional Patent Application Ser. No. 61/705,219, filed Sep. 25, 2012, having the title "Fully Welded Rackable Panel and Method of Making Same" by Jim Lachenberg, which is incorporated herein by reference in its entirety.

BACKGROUND OF THE INVENTION

Field of the Invention

This invention relates to metallic fencing and railing systems and in particular to improved designs for manufacturability, adjustability, and strength.

Background Art

Metal fences and railings are costly to fabricate and are subject to environmental degradation, particularly rusting when steel is used. In its most simple form, a fence panel comprises a pair of horizontal metal rails (top and bottom) that are connected to the top and bottom portions of a number of vertical metal pickets - the top rail is connected to the top portions of the pickets and the bottom rail is connected to the bottom portions of the pickets—whereby a single unit is formed. The rails and pickets are joined together at a manufacturing shop, typically by welding, and then transported to a customer's site to accommodate a range of different conditions including horizontal and sloped surfaces. The term "panel" as used herein denotes this simple structure, irrespective of whether the pickets all intersect the rails at 90°—such as when the panel is used on a horizontal surface, or whether the pickets all intersect the rails at an angle θ, which is other than 90°—such as when the panel is used on a sloped terrain or as a railing on a stairway.

For maximum strength and durability fence panels are made from metal (e.g., steel or aluminum) and then welded, which is best accomplished at the shop using equipment that is not readily transportable. This is particularly important when the panel is a railing whose pickets are all oriented at the same predetermined angle θ with respect to the rails and spaced precisely apart from each other.

Railing panels are custom-made to match the angle of a stair, ramp or sloped-terrain. This is achieved by taking measurements at a customer's site to determine the angle and length of each railing panel. The measurements are then taken back to the shop and pickets are cut at the measured angle and welded to the top and bottom rails of the railing. Thereafter, the finished railing is taken to the customer's site with the hope that the angle was measured, cut and welded correctly. Three operations were therefore needed to construct the railing:

1) Field measuring;
2) Cutting pickets at the exact angle; and
3) Welding the pickets to the top and bottom rails at that exact angle.

If there was a mistake in any of the above operations, the railing will not look level or symmetrical and will have to be scrapped and/or re-fabricated. To avoid such a waste of time and material, many solutions have been proposed that enable pickets to be oriented at an adjustable angle with respect to the top and bottom rails. Those solutions have frequently required that holes be drilled into the pickets, thereby exposing them to rust, particularly when the pickets comprise steel tubes. Other solutions have employed brackets, and numerous extra parts to achieve pivotal connections between the pickets and the rails —all of which are undesirably expensive. It is therefore desirable to design an environmentally durable metal fence panel that is easy to manufacture, requires only a minimum number of component parts and, when used as a railing, can be adjusted at a customer's site to match the exact angle of the stair, ramp or sloped-terrain.

SUMMARY OF THE INVENTION

The present invention is a fully welded fence panel comprising a number of spaced-apart vertical metal pickets having top and bottom portions that are welded to a pair of horizontal metal rails. The top and bottom portions of each metal picket are flattened and then welded to the rails.

In preferred embodiments the fence panel comprises rails and square steel tubes that are powder coated to simulate wrought iron fencing, but at much lower cost. And when the fence panel is used as a railing, the flattened portions of the pickets are oriented perpendicular to the lengthwise direction of the rails thereby enabling the fence panel to be racked in order to change the angle between the pickets and rails and used on sloped surfaces or as a railing on a stairway. As used herein, racking means moving one rail of the panel relative to the other rail in order to change the angle between the pickets and the rails.

One object of the present invention is to eliminate the need for welding the metal tubes to the rails on more than two sides. By flattening the end portions of the metal tubes, there are effectively only two sides available for welding.

Another object of the present invention is to eliminate the need for cutting the top and bottom portions of each metal picket at a predetermined angle prior to welding when the fence panel is to be used as a railing.

Yet another object of the present invention is to provide a fully welded fence panel that can either be completely racked at the customer's site or slightly racked at the site to compensate for minor measuring and manufacturing errors. As used herein, the term "fully welded" means that the pickets and rails are joined together by welding; and that when the fence panel is used as a railing, the angle between the pickets and rails is adjustable without the need for pins, hinges, or any additional components. Moreover, the rails themselves preferably include flattened end sections that are welded to a pair of supporting fence posts at each end of the fence panel—thereby rendering the entire assembly of a fence panel and supporting posts rackable. Advantageously, a fully welded solution provides greater strength and rigidity when compared to adjustable fence panels having additional component parts that are costly to fabricate and more susceptible to corrosion.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A is a perspective view of a picket comprising a rectangular metal tube;

FIG. 3B, FIG. 3C and FIG. 3D respectively show perspective, front, and side views of the picket shown in FIG. 3A after its top portion has been flattened;

DETAILED DESCRIPTION

Figure 1:
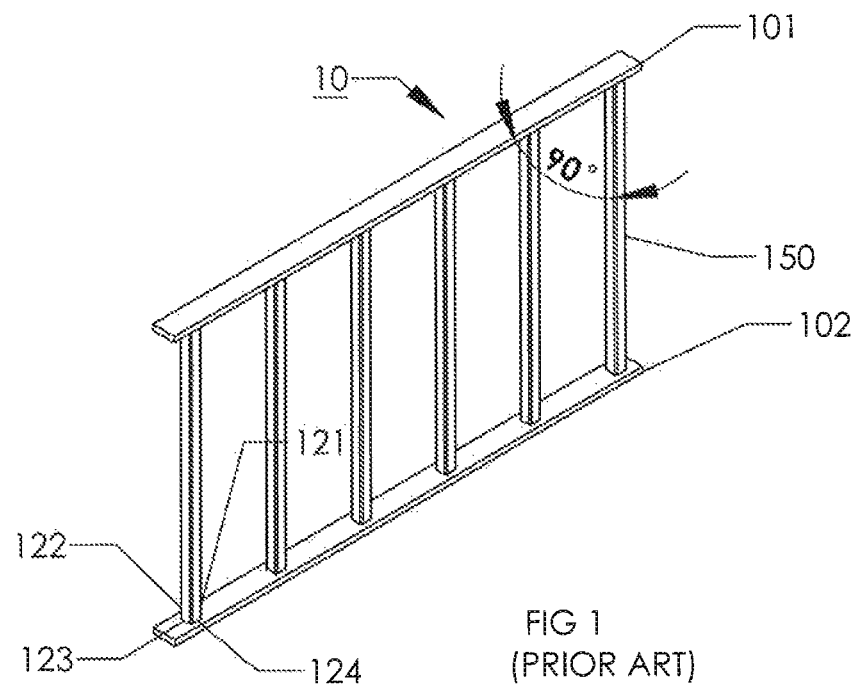
FIG. 1 shows a prior-art fence panel for use on a horizontal surface where the pickets all intersect the top and bottom rails at a 90° angle.

FIG. 1 shows a prior-art fence panel 10 comprising a number of vertical metal pickets 150 that are welded to a pair of horizontal metal rails 101, 102. For use on a flat terrain, the pickets and rails intersect each other at 90° angles and the pickets generally comprise rectangular metal tubes that are welded to the rails. Metal tubes are less expensive than wrought iron but provide the same desirable appearance when properly coated. Welding is required at each of four locations where a picket intersects the rail. As illustratively shown in FIG. 1, four welds 121, 122, 123 and 124 are made where the bottom of one picket intersects the bottom rail 102. Obviously, four welds need be made at the top and bottom of each picket, which is time consuming but nevertheless required for panel strength and rigidity. Welding also eliminates locations where water can enter and cause rusting, particularly in panels made from steel.

Figure 2:
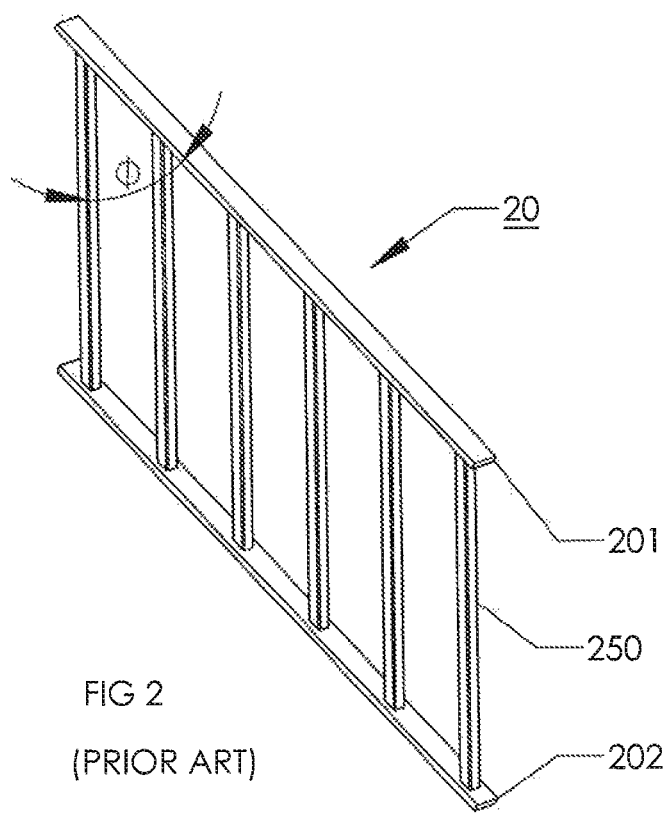
FIG. 2 shows a prior-art railing for use on a sloped surface where the pickets all intersect the top and bottom rails at an angle θ, which is less than 90°.

FIG. 2 shows a prior-art railing 20 comprising a number of vertical metal pickets 250 that are welded to a pair of horizontal metal rails 201, 202. For use on sloped terrains or stairways, the pickets and rails intersect each other at some angle θ, which is less than 90°. However, before welding, the top and bottom portions of each picket need to be cut at the angle θ to match the angle that was previously measured at the customer's site. FIG. 3A shows a cut line 310 at the top portion of a picket 350 illustrating where a cut is to be made in a picket to create the angle θ. Although not shown in FIG. 3A, a similar cut needs to be made at the bottom portion of the picket. Similar to fence panel 10 shown in FIG. 1, welding is required at each of four locations where each picket intersects the rail. Such welding is done at the manufacturing shop and the finished railing is then transported to the customer's site with the expectation that it is properly angled to match the terrain or stairway. Unfortunately, if the angle θ was measured incorrectly, then the railing will probably need to be returned to the manufacturing shop, scrapped and re-manufactured. Otherwise its appearance will be unsatisfactory and may not even be able to be installed at the customer's site. For aesthetic reasons, the pickets should always be perpendicular to earth's surface.

Fence Panel/Railing Construction

Pickets can be made from tubes or solid rods. However, for practical reasons such as cost and handling, tubes are preferably used. FIG. 3A discloses the top portion of a metal tube 350 that is suitable for use in the present invention. Illustratively, tube 350 is rectangular having side-to-side widths W1 and W2, although any configuration or profile (e.g., square, hexagonal, round, elliptical, etc.) is acceptable. In preferred embodiments of the present invention $W_1=W_2$ and tube 350 has a square cross section. Pickets can also have different thicknesses and lengths. Illustratively, the tube thickness "t" is preferably 14 gauge, although thicknesses between 11 gauge and 18 gauge are frequently used depending on the required rigidity and aesthetics of the fence or railing. Illustrative steel tube dimensions are between ⅜" and 1" in diameter, or side-to-side if they are rectangular. Illustrative aluminum tube dimensions are between ½" and 1" in diameter, or side-to-side if they are rectangular. Finally, typical picket lengths for railings are selected such the distance from the ground surface to the top rail are about 36" in residential applications and about 42" in commercial applications. Additionally, the maximum distance between pickets is generally about 3⅞" in order to avoid a child's head from being captured therebetween.

As shown in FIG. 3A, the top end of metal tube 350 is perpendicular to the lengthwise direction of the tube. However, when manufacturing prior-art railing 20 shown in FIG. 2, it is necessary to cut the top end of metal tube 350 along cut line 310 at an angle θ to match the measured angle at the customer's site. Naturally, the bottom end of tube 350 (not shown) will need to be cut at the same angle θ. By way of contrast, the top and bottom portions of tube 350 only need to be flattened in the present invention. Not only does this save time, but it also facilitates the subsequent welding process, which now only requires welding on the two flattened sides of the tube rather than all four sides for rectangular tubes or completely around a circular tube.

Once the raw material for use as pickets has been selected and cut to desired lengths, the pickets are inserted into the tooling of a mechanical or hydraulic press. Each picket end is pressed with the same exact configuration. FIGS. 3B, 3C and 3D respectively show perspective, front and side views of the top portion of picket 350 after it has been pressed in a die and flattened. Each flattened portion 361 has a thickness of approximately 2 t, and each flattened portion has a length "L" that is preferably between ¼" and 1" at each end of the picket, although the actual length will depend on style design and be determined by the die of the press. Additionally, the die presses an indentation 365 into the surface of each flattened portion 361 that is perpendicular to the length of the picket thereby further reducing its cross-section area at that location and further enhancing the rackability of the fence panel. In preferred embodiments of the invention, an additional indentation 366 is pressed into the opposite side of flattened portion 361 as shown in FIG. 3D. Although not shown in these figures, the bottom portion of tube 350 is similarly pressed and flattened.

Figure 4:
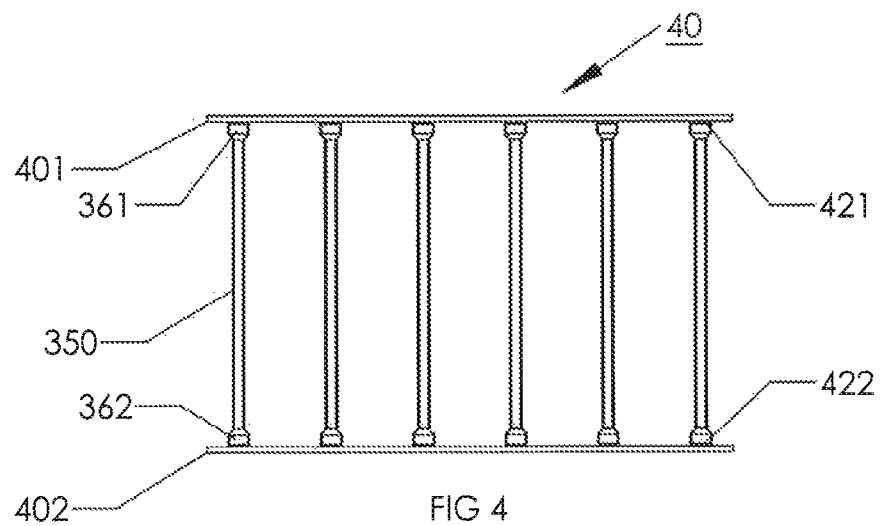
FIG. 4 shows a fence panel in accordance with the present invention wherein the flattened portions of the pickets are oriented parallel to the top and bottom rails.

Fence panel 40, shown in FIG. 4, discloses an embodiment of the present invention wherein the metal tubes 350 are oriented such that their flattened portions 361, 362 are parallel to the lengthwise direction of metal rails 401, 402. Welds 421, 422 are easily made at the top and bottom of each tube respectively because their corresponding flattened portions 361, 362 are easily accessible to welding equipment and because only two sides need to be welded. Welds are also made at the rear side of fence panel 40, not shown, for strength and rigidity. It is important that welds be made that fully enclose the joint between each tube and rail in all embodiments of the present invention in order to prevent the incursion of water. However, because the flattened portions of the metal tubes are oriented as shown in FIG. 4, panel 40 is not rackable. Nevertheless, its ease of manufacture renders it highly desirable for use on all horizontal surfaces.

Figure 5:
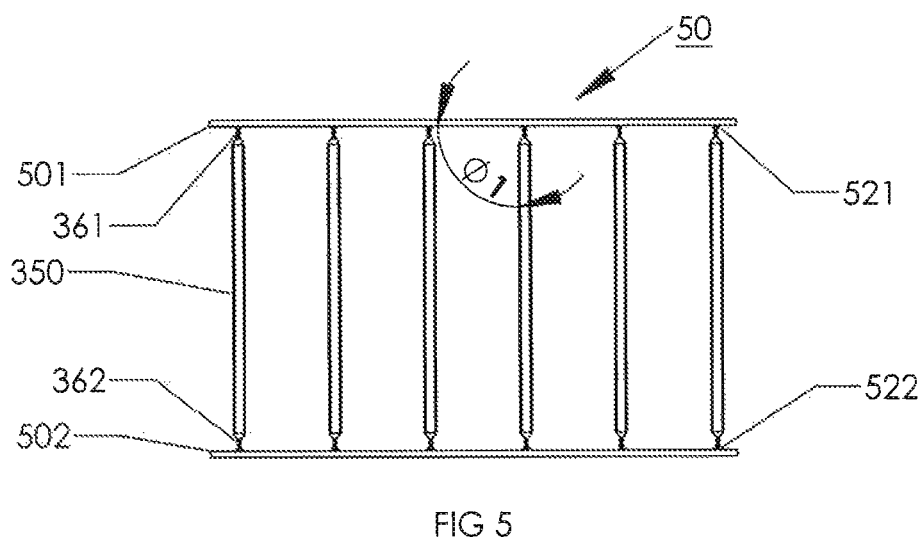
FIG. 5 shows a fence panel in accordance with the present invention wherein the flattened portions of the pickets are oriented perpendicular to the top and bottom rails.
Figure 6:
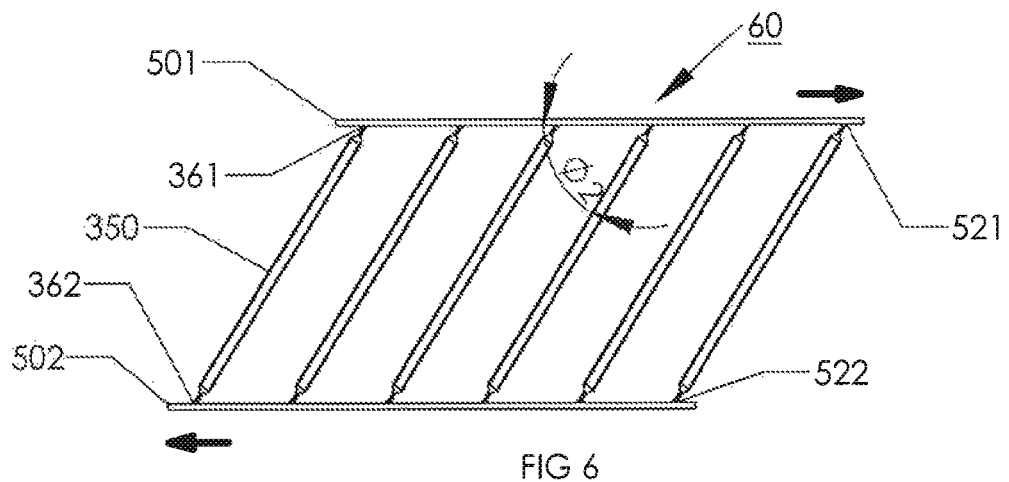
FIG. 6 shows the fence panel of FIG. 5 after it has been racked for use as a railing.

Fence panel 50, shown in FIG. 5 discloses an embodiment of the present invention in which the metal tubes 350 are all oriented such that their flattened portions 361, 362 are perpendicular to the lengthwise direction of metal rails 501, 502. Weld 521 is made on both sides of the flattened portion 361 at the top of each tube 350, and weld 522 is made on both sides of the flattened portion 362 at the bottom of each tube 350. Because of this particular orientation, fence panel 50 is rackable as shown in FIG. 6. As previously stated, racking means moving one rail 501 of the panel 60 relative to the other rail 502 in order to change the angle between the tubes and the rails. The force required during racking is a function of the metal used, the overall thickness of the flattened portion, the indentation that is pressed into the flattened portion, and the number of pickets in the fence panel; but is desirably low enough to be performed by one person at the customer's site. This is particularly important when minor adjustments to a prefabricated railing are needed. As shown in FIG. 5, prior to racking the metal tubes 350 all intersect the rails 501, 502 at an angle θ1. As shown in FIG. 6, after racking, the metal tubes 350 all intersect the rails 501, 502 at a different angle θ2. Stairways are most commonly designed to have a 7" rise and an 11" step so that the angle of the stairway with respect to earth's surface is typically between 28° and 32°. Therefore, in a stairway railing, typical values for θ2 are between 58° and 62°.

Metal Protection

In order to protect the panels from environmental degradation, particularly those made of steel, a protective coating is applied. Typical protective coatings include paint, powder and zinc. In preferred embodiments, a powder coating is used because, visually, it highly resembles wrought iron.

Galvanization refers to the coating of steel or iron with zinc. This is done to prevent rusting of the ferrous item. The value of galvanizing stems from the corrosion resistance of zinc. The zinc serves as a sacrificial anode, so that it cathodically protects exposed steel, which means that even if the coating is scratched or abraded, the exposed steel will still be protected from corrosion by the remaining zinc. It is noted that a hot-dip zinc coating produces a thick, durable and matte gray coating, whereas electroplating produces a thin coating that is quickly depleted rendering it unsuitable for outdoor applications.

Powder coating is a type of coating that is applied as a free-flowing, dry powder. The main difference between a conventional liquid paint and a powder coating is that the powder coating does not require a solvent to keep the binder and filler parts in a liquid suspension form. Powder coating is typically applied electrostatically and is then cured under heat to allow it to flow and form a skin. The powder may be a thermoplastic or a thermoset polymer. It is usually used to create a hard finish that is tougher than conventional paint. To avoid possible cracks in the protective coating, the panel may be racked at the shop to the approximate desired angle before the protective coating is applied. Additional minor racking can then be performed as needed at the customer's site with less fear of introducing cracks, which may allow water to enter and cause corrosion.

Attaching Fence Panel to End Post(s)

Figure 7A:
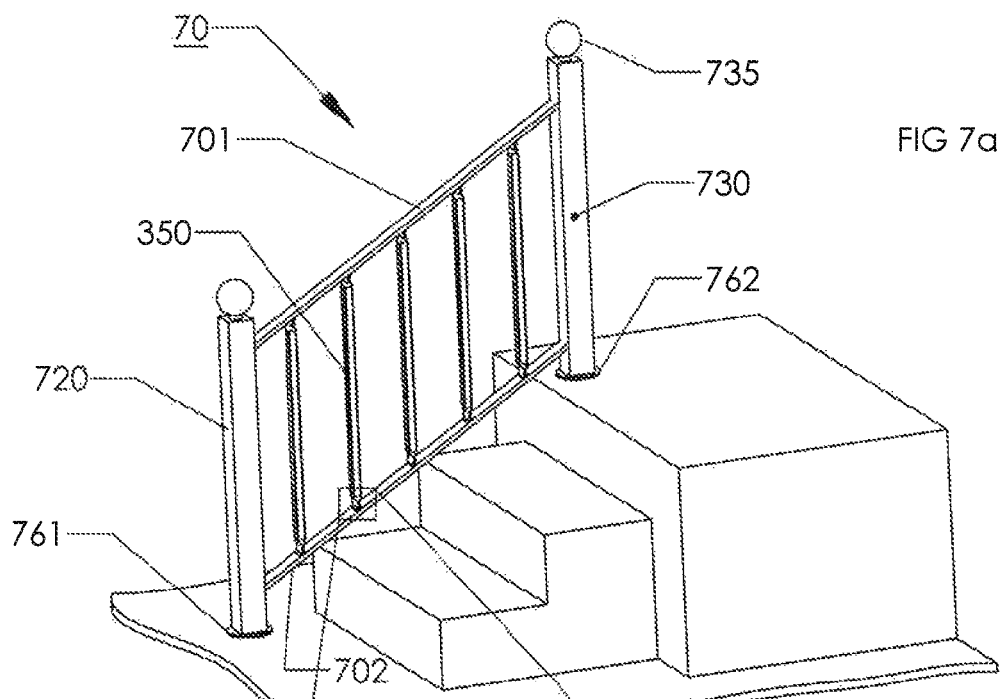
FIG. 7a shows a perspective view of a fence panel in accordance with the present invention after it has been racked and installed as a railing at a customer's site.
Figure 7B:
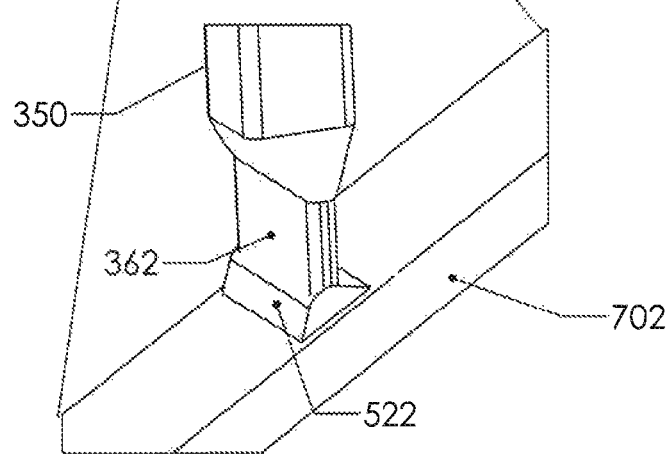
FIG. 7b is a magnified-section view of a portion of the fence panel shown in FIG. 7a illustrating the welded connection of a picket to the bottom rail.
Figures 8A, 8B:
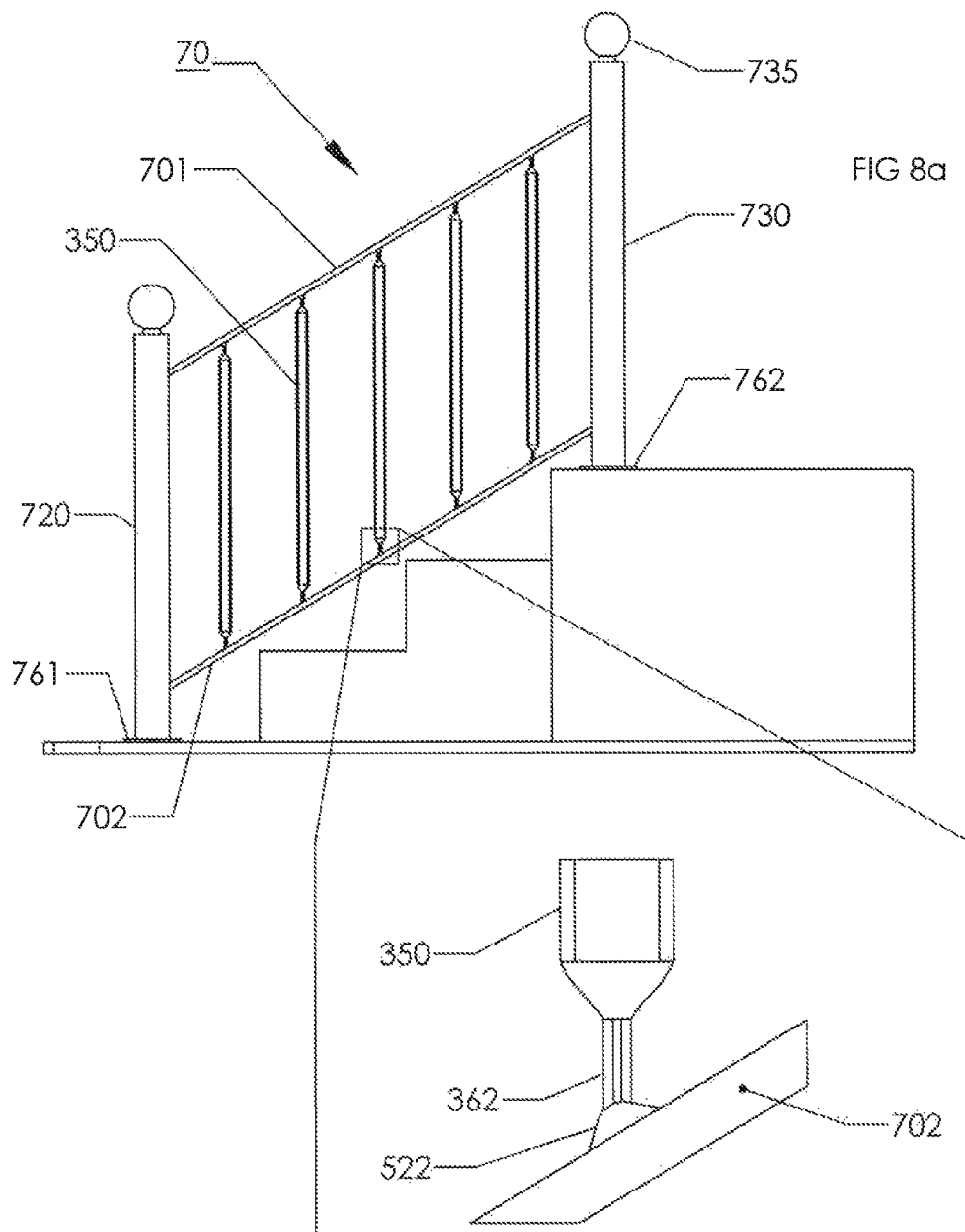
FIG. 8a shows a side view of a fence panel in accordance with the present invention after it has been racked and installed as a railing at a customer's site.
FIG. 8b is a magnified-section view of a portion of the fence panel shown in FIG. 8a illustrating the welded connection of a picket to the bottom rail.

A finished railing 70 is shown in perspective and side views in FIGS. 7a, 8a after installation at the customer's site. Once pickets 350 are welded to rails 701, 702 and powder coating has been applied, the completed panel is attached to end posts 720, 730 for support. Illustratively, each end post is topped with an adornment 735 for aesthetic reasons. As shown in the magnified-section views of FIG. 7b and FIG. 8b, a weld 522 secures the flattened portion 362 of picket 350 to the bottom rail 702. Similar welds are made at the top of each picket to rail 701.

The attachment of the rails to the vertical end posts 720, 730 can be achieved by welding, by brackets or by any other means to secure the panel to the posts. In a preferred embodiment, the ends of the rails 701, 702 are flattened and then welded to the end posts 720, 730 at the manufacturing shop. The surfaces of the flattened ends are oriented perpendicular to the posts—thus rendering the entire assembly comprising the panel and end posts rackable. Alternatively, the ends of the rails need not be flattened. Instead, a cap is attached to the ends of each rail—one side of the cap is flattened and welded to the post while the other side of the cap is shaped to receive the rail.

Round cores 761, 762 are drilled in the customer's walkway and steps in order to maintain the posts in an upright position. Concrete is then poured into the core openings after the posts have been inserted. All other standard railing components can be applied to complete the finished railing such as standard cap rail thereby completing the installation.

Although a particular embodiment of the invention has been shown and described, various modifications are possible within the scope of the invention. In particular, it is understood that components such as cap rails, caps and posts may be attached to the fence panel by any means and not welded thereto; that flattened end sections of each rail may be made either by pressing the rail itself or by inserting the rail into a cap that is suitably shaped; that protective coatings can either be applied before the fence panel is racked or omitted altogether; and that steps in any method claim need not necessarily be performed in the order recited.

What is claimed is:

1. A rackable fence panel comprising:
upper and lower horizontal metal rails having length, the rails defining a width between opposed side edges;
a plurality of spaced-apart rectangular, vertical metal tubes each tube having a thickness (t), side-to-side widths (W1, W2), and flattened top and bottom portions, said flattened portions having a maximum thickness (2t) that is twice the wall thickness of each tube, and a width that is approximately the sum of the side-to-side widths of each tube;
wherein the flattened top portion of each tube intersects the upper rail along a lateral line that is perpendicular to the lengthwise direction of the upper rail and is welded thereto;
wherein the flattened bottom portion of each tube intersects the lower rail along a lateral line that is perpendicular to the lengthwise direction of the lower rail and is welded thereto; and
wherein the width of said flattened portions does not exceed the width of the rails such that each tube does not extend laterally beyond the side edges of the rails.

2. The fence panel of claim 1 wherein the tubes have a wall thickness between 11 gauge and 18 gauge.

3. The fence panel of claim 1 wherein the metal rails and tubes comprise steel.

4. The fence panel of claim 1 wherein the metal rails and tubes comprise aluminum.

5. The fence panel of claim 1 wherein the metal rails and tubes are coated with a protective material to protect them from environmental degradation.

6. The fence panel of claim 5 wherein the protective material comprises a powder coating.

7. The fence panel of claim 1 wherein the tubes comprise square metal tubes.

\* \* \* \* \*